J. S. Smith.
Cotton Scraper.
No. 86,704. Patented Feb. 9, 1869.
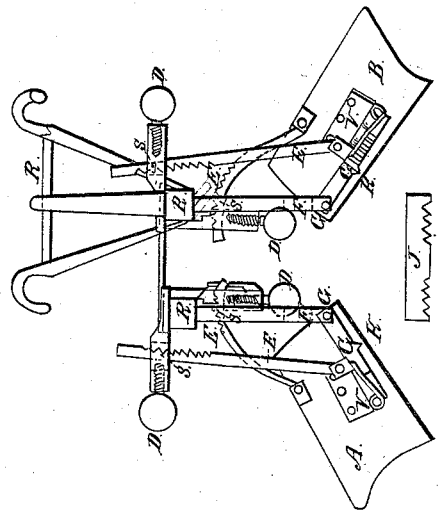
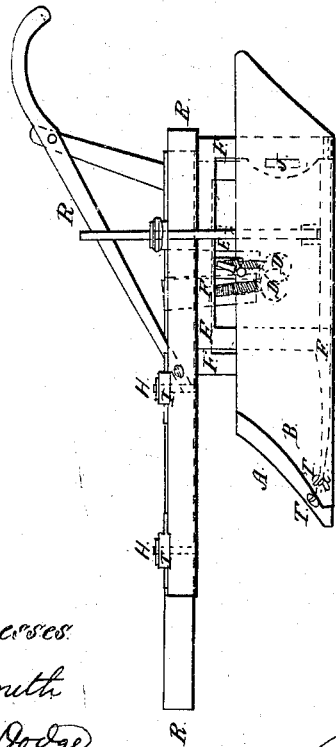
Witnesses
Wm. A. Smith
Steph. G. Dodge
Inventor
James Scott Smith

JAMES SCOTT SMITH, OF HELENA, ARKANSAS.

Letters Patent No. 86,704, dated February 9, 1869.

IMPROVEMENT IN COTTON-SCRAPERS.

The Schedule referred to in these Letters Patent and making part of the same.

*To all whom it may concern:*

Be it known that I, JAMES SCOTT SMITH, of Helena, in the county of Phillips, in the State of Arkansas, have invented a new and useful Improvement for Scraping Cotton; and I do hereby declare that the following is a full and complete description thereof, reference being had to the accompanying drawings, and the letters of reference marked thereon.

A B, two scrapers.
C C, ground-plate.
G G, socket-joint.
F F, the frames to which they are attached.
R R, frame.
E E E E, braces.
S S S S, slot.
D D D D, thumb-screw.
T T, prow.
$u\,u$, orifices.
V V, hinges.
H H, dividing-plate.
I I I I, nuts.
J, bar.
K K, cutting-board.

The nature of my invention consists in scraping both sides of the row, the scrapers straddling the row of young growing cotton, at one and the same time, by and with the aid of two scrapers, A B, attached to the ground-plate C, by the means of hinge V, from T T, through the orifice $u\,u$, that is attached to the frames F F by means of a socket-joint, G, in F F, that are fastened securely to the two beams and frames R R, and held in the position to suit whatever elevation the rows may be, on which the young cotton is growing, by and with the aid of braces, E E E E, they being secured to A B and C C at the lower end, and, at the upper, they passing through slots, S S S S, and held in position by the means of thumb-screw D D D D.

So that scrapers A B can be adjusted to the different undulations of the ground, I pass the prow T T through the orifices $u\,u$ in the front end, and at rear by the hinges V V, that are attached to the ground-plate C, this desired object is attained.

The two dividing-plates H H are fastened and held securely in place by the aid of nuts, I I I I. By this arrangement the rows can be scraped close to or far from the young growing cotton. So as to give strength to the rear part of machine, and also prevent the scrapers A B from being crowded together and out of line from their forward points, I place in rear of and through the frame F F, the bar J. So, again, as to more effectually control the scrapers A B in a regular line, I attach the cutting-board K K, which buries itself in the ground, controlling the position of A B.

What I claim as my invention, and desire to secure by Letters Patent, is—

1. The scrapers A B, ground-plates C C, frame F F, frame R R, thumb-screws D D D D, braces E E E E, slots S S S S, as constructed, combined, and arranged.

2. Prows T T, orifices $u\,u$, hinges V V, in combination with scrapers A B and plates C.

3. In combination with scrapers A B and ground-plates C C, the plates H H, nuts I I I I, bar J, and cutting-boards K K, all as described and shown, and for the purposes specified.

JAMES SCOTT SMITH.

Witnesses:
WM. A. SMITH,
STEPH. G. DODGE.